Sept. 19, 1933.     S. G. LANGLEY     1,927,176
BRUSH MOUNTING MEANS
Filed May 5, 1931
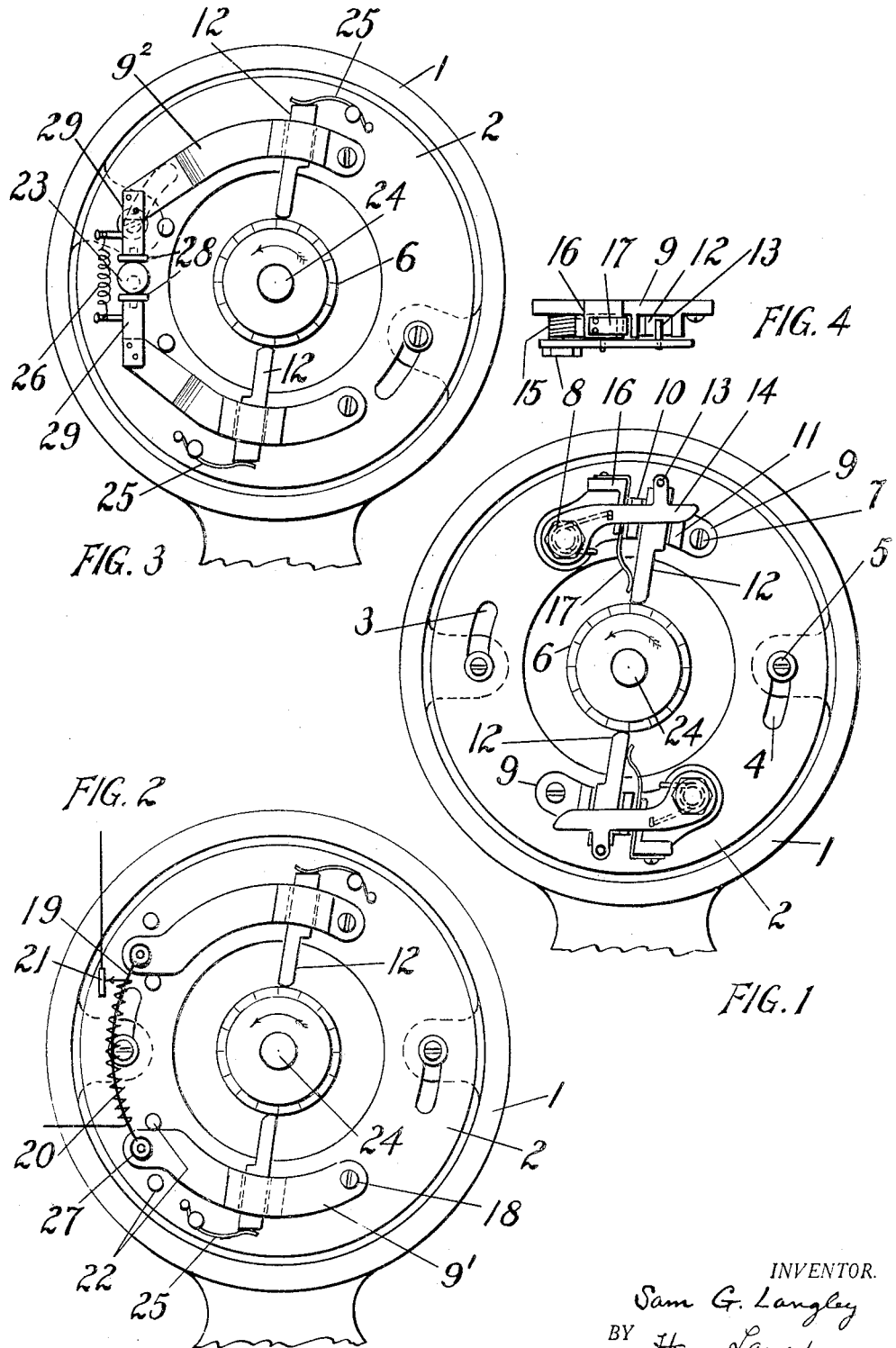
INVENTOR.
Sam G. Langley
BY Henry Lanahan
ATTORNEY Patented Sept. 19, 1933

1,927,176

UNITED STATES PATENT OFFICE 1,927,176

BRUSH-MOUNTING MEANS

Sam G. Langley, Maplewood, N. J., assignor to Thomas A. Edison, Incorporated, West Orange, N. J., a corporation of New Jersey Application May 5, 1931. Serial No. 535,104

9 Claims. (Cl. 171—324)

This invention relates to brush-mounting means particularly adapted for use in small series-wound motors provided with commutators.

In these small motors, which are ordinarily used in the operation of phonographs, advertising devices, office appliances and the like, the amount of friction set up by the brushes bearing on the commutators is considerable, and may under certain conditions become very high in comparison to the output of the motors.

Ordinarily, the brushes on a dynamo electric machine, whether it be a generator or motor, are usually fitted, at least to some extent, to the periphery of the commutator by grinding or by drawing sandpaper between the end of the brushes and the commutator surface. After this has been done in a small motor, such as referred to, and the motor started, its armature will have a certain speed and torque, and after running a short time, an examination of the working face of any of the brushes will show that the area in contact with the commutator is still very small because of insufficient wear to bring it to a perfect surface. This means that during this time, the drag or load of the brushes will be relatively small, and the speed or torque of the armature will therefore be substantially at maximum.

As the motor continues in operation, the brushes "wear in" or tend to become seated over their entire area, thereby offering more resistance to the turning of the armature, slowing down the speed of the motor. Other conditions, such as a small amount of oil on the commutator surface, or lubricant in the brushes themselves, assist in bringing about a more nearly perfect seat of the brushes on the commutator, thereby greatly increasing the drag or load on the motor, with consequent reduction of speed as above set forth.

Smooth or glazed commutator surfaces and perfect seating of the brushes thereon, are results which engineers always strive for in the operation of generators and motors used for most purposes. I have found, however, that these ideal conditions are not those which are desirable in the operation of small series motors to which my invention is particularly applicable. It is therefore the principal object of my invention to reduce the friction or drag of the brushes on the commutator of such a motor, by providing means which will prevent "wearing in" of the brushes and will maintain only a small area thereof in contact with the commutator whereby the speed and torque of the motor will be more nearly uniform.

I have illustrated my invention on the accompanying drawing which shows more or less diagrammatically several ways in which it may be applied in practice. In the drawing:

Figure 1 is a view in end elevation of a motor equipped with one form of brush-mounting means, incorporating the principles of my invention;

Fig. 2 is a view similar to Figure 1, illustrating a modified form of my invention;

Fig. 3 is a view, similar to Figs. 1 and 2, showing a still further modified form of my invention; and Fig. 4 is a plan view looking down on one of the brush-holders shown in Figure 1.

Referring now to the drawing wherein like numbers refer to corresponding parts in the various views, 1 designates a motor frame which carries a brush-holder ring 2 of insulating material. The ring 2 is slotted at 3 and 4 to permit adjustment thereof to get the proper commutating position, clamping screws 5 being used to hold the ring 2 in adjusted position. The motor commutator is designated by the number 6. On the ring 2, is attached in any satisfactory manner, as by clamping screws 7 and studs 8, a pair of brush-holders 9.

As shown in Figure 1, the brush-holder 9 of the mounting means for each of the brushes 12, is of the box type, the sides of the box being formed by the flanges 10 and 11, between which the brush 12 is loosely positioned for limited lateral movement. The brush 12 is held against the commutator 6 by a pin 13 carried by an arm 14 which is pivotally mounted on one stud 8. A spring 15 has one end fixed in position on the holder 9 and its other end engaging the arm 14 to put a certain amount of pressure on the brush 12 to hold it against the commutator 6. On the brush-holder 9, is a lug 16 to which is fastened a resilient member in the form of a spring 17. The free end of the spring 17 is adapted to engage the brush 12 at a point closely adjacent the commutator 6.

By reason of this construction, any material increase in friction or drag on the brush, due to the better seating thereof on the commutator, will effect movement of the brush toward the spring 17, which is designed and arranged to yield slightly to such movement, thereby unseating the brush and bringing it to a position in which it has a smaller area in contact with the commutator. The spring 17 is of such strength as to overcome the tendency spring 15 has to hold the brush 12 in one position of engagement with the commutator. When the brush 12 has been slightly moved under the action of the drag or friction of the commutator surface thereon, as described, spring 17 will be deflected and tensioned to such an extent as to produce a nearly balanced condition between the thrust exerted thereby on the brush and the thrust exerted on the brush, in opposition to the spring, by the drag or friction of the commutator surface. Accordingly, repeated movements, sometimes in one direction and sometimes in the opposite direction, will be imparted to the brush by the action of spring 17 and of the drag or friction of the commutator surface. The actions described tend to maintain the contact area of the brush and thereby the drag or friction of the commutator surface thereon at a minimum and the speed and torque of the motor constant and at a maximum. Only a very small movement of the brush or brushes, as described, is needed to accomplish these results. As a matter of fact, I have found that any such movement of the brushes need be only a few thousandths of an inch.

Another construction for accomplishing the desired results is shown in Figure 2, wherein each of the brush-holders 9' has one end pivoted at 18 to the ring 2, while the opposite ends of the brush-holders are connected by a bi-metallic strip 19 associated with which is an electrical heating coil 20, forming a thermostat. A contact member 21 is arranged in the circuit of the coil 20 to automatically and periodically open the circuit through the coil as the strip 19 responds to the heating action of the coil. The current for coil 20 may be taken directly from the line which furnishes current to the motor, or from a derived circuit in shunt with either the armature or one or both field coils of the motor. The bi-metallic strip 19 is secured at its ends to insulators 27 carried by the brush-holders 9', and as the strip 19 expands and contracts under the heating action of coil 20, the ends of the brush-holders connected by said strip are moved away from or toward each other sufficiently to change the points of contact of the brushes 12. Stop pins 22 are preferably utilized to limit the motion of the brush-holders.

A similar result may be obtained by the mechanical arrangement shown in Figure 3, wherein the ends of the brush-holders 9², remote from their pivotal mountings, are held in continuous engagement with a rotating cam member 23 by means of a spring 26 connected to and coacting with the said ends of the brush-holders. The cam 23 may be rotated by suitable mechanical speed-reducing means actuated from the motor shaft 24. The surfaces 28 on which the cam 23 operates, are preferably provided on the outer ends of hardened pins attached to suitable insulators 29 which are secured to the brush-holders. In Figures 2 and 3, the brushes 12 are held against the commutator 6 by springs 25 which act directly on the outer ends of the brushes.

From what has been said, it will be observed that the construction for slightly moving or unseating the brushes to accomplish the results sought, may be varied considerably without departing from the spirit of my invention or the scope of the appended claims.

Having thus described my invention, what I claim is:

1. A small commutator motor having brushes which are substantially immovable lengthwise of the commutator and which are shiftable with respect to the commutator in a direction transverse to its axis, and means including devices which when the motor is running coact with the brushes to shift the same slightly in the direction specified as they tend to become "seated" and thereby change the surface portions of the brushes contacting the commutator.

2. A small commutator motor having brushes which are substantially immovable lengthwise of the commutator and which are shiftable with respect to the commutator in a direction transverse to its axis, and means including devices which when the motor is running respectively coact with the brushes to automatically and intermittently shift the same slightly in the direction specified and thereby effect a change in the surface portions of the brushes contacting the commutator as the friction between the brushes and the commutator tends to increase by "seating" of the brushes.

3. In a small commutator motor having brushes, means acting when the motor is running to shift the brushes slightly and repeatedly to change the angle of presentation thereof to the commutator.

4. In a small commutator motor having brushes, electrically operated means acting to shift the brushes slightly and repeatedly when the motor is running to change the angle of presentation of the brushes to the commutator.

5. In a small commutator motor having brushes, thermostatically operated means acting to shift the brushes slightly and repeatedly when the motor is running to change the angle of presentation of the brushes to the commutator.

6. In a small commutator motor having brushes, mechanically operated means acting to shift the brushes slightly and repeatedly when the motor is running to change the angle of presentation of the brushes to the commutator.

7. In a small commutator motor having brushes, cam operated means acting to shift the motor brushes slightly and repeatedly when the motor is running to change the angle of presentation of the brushes to the commutator.

8. In a small commutator motor having at least one pair of brushes, holders for said brushes, said holders being pivotally supported at one end, a movable cam in operative engagement with the other ends of said holders, and resilient means for holding the said other ends of the holders in contact with the cam.

9. In a small commutator motor having at least one pair of brushes, holders for said brushes, said holders being pivotally supported at one end, and a thermostatic device connected between the other ends of said holders.

SAM G. LANGLEY.